United States Patent [19]

Sims

[11] 3,861,025
[45] Jan. 21, 1975

[54] METHOD FOR TESTING AND BALANCING DYNAMOELECTRIC MACHINE ROTOR END RINGS

[75] Inventor: Marion W. Sims, Fort Wayne, Ind.

[73] Assignee: General Electric Company, Fort Wayne, Ind.

[22] Filed: Apr. 6, 1973

[21] Appl. No.: 348,758

Related U.S. Application Data

[62] Division of Ser. No. 209,872, Dec. 20, 1971.

[52] U.S. Cl. ............. 29/593, 324/37, 324/158 MG
[51] Int. Cl. ............................................ G01r 33/00
[58] Field of Search .......... 29/593, 598; 324/37, 40, 324/51, 55, 47, 144, 147, 158 R, 158 MG, 34 PS, 34 E, 34 MC, 43 R, 43 G; 322/99

[56] References Cited
UNITED STATES PATENTS

| 2,353,211 | 7/1944 | Zuschlag | 324/37 |
|---|---|---|---|
| 2,474,883 | 7/1949 | Zenor | 324/158 MG |
| 2,640,100 | 5/1953 | Packer et al. | 324/158 MG |
| 2,872,723 | 2/1959 | Levine et al. | 29/593 |
| 2,877,406 | 3/1959 | Hochschild | 324/37 X |
| 2,877,408 | 3/1959 | Williams | 324/158 R X |
| 2,924,773 | 2/1960 | Lukke | 324/158 MG |
| 2,999,981 | 9/1961 | Probert | 324/158 MG |
| 3,617,874 | 11/1971 | Forster | 324/37 |

Primary Examiner—C. W. Lanham
Assistant Examiner—Joseph A. Walkowski, Jr.
Attorney, Agent, or Firm—John M. Stoudt; Ralph E. Krisher, Jr.; Joe E. Barbee

[57] ABSTRACT

Method and apparatus for the nondestructive testing of the bars and end rings of a cast aluminum squirrel cage rotor. The rotor may be of the single cage or double cage type. The rotor is tested before it is assembled into a stator. Magnetic field generators are placed adjacent the rotating bars and end rings to induce voltages therein, and corresponding magnetic flux receivers are properly positioned to measure the magnetic flux associated with the current caused to flow in the bars and end rings as a result of their rotation through the magnetic fields. The measured flux indicates any defects in the bars or end rings.

4 Claims, 16 Drawing Figures

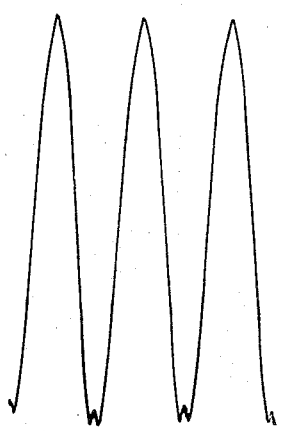
FIG.15
FIG.14
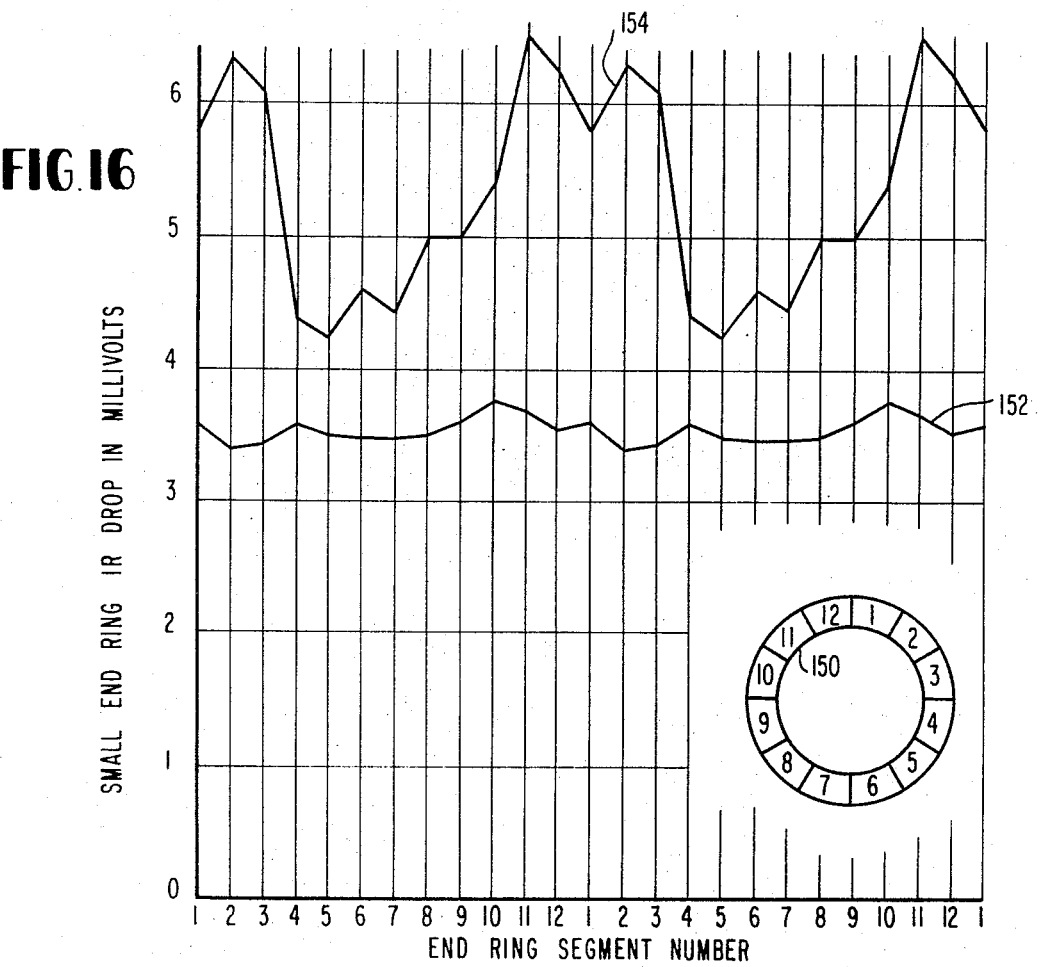
FIG.16

METHOD FOR TESTING AND BALANCING DYNAMOELECTRIC MACHINE ROTOR END RINGS

CROSS REFERENCE TO RELATED APPLICATION

This application is a division of my copending application Ser. No. 209,872, filed Dec. 20, 1971.

BACKGROUND OF THE INVENTION

FIELD OF THE INVENTION

The invention relates generally to the field of testing for defects in the conductors of a dynamoelectric machine rotor before the rotor is assembled with a stator to form a dynamoelectric machine, and, more particularly, to testing for defects in the end rings of a cast aluminum squirrel cage rotor of the single cage or double cage type.

Previous methods of testing rotors of induction type machines have required the use of the machine stator core. An example of such a prior art method is disclosed in U.S. Pat. No. 2,844,794, assigned to the assignee of the present application. Still other rotor quality analysis procedures have resulted in the destruction of the rotor being tested or analyzed.

Rotors for many modern small induction motors are basically simple, i.e., the electromagnetic elements thereof include a stack of steel laminations and an aluminum squirrel cage conductor arrangement, usually formed as a die-casting. Manufacturing techniques have been perfected to the point where these rotors are mass produced with a high probability of uniform and good qualities. There are, however, a number of possibilities for deficiencies. Porosity or impurities in the aluminum casting can interfere with electrical resistance; poor insulation between the squirrel cage conductors, and the iron core can produce intermediate end ring effects tending to nullify skew; open circuits in bars can occur; and various other defects appear from time to time.

It thus would be desirable to provide new and improved apparatus and methods that would be useful for economically and reliably testing dynamoelectric machine rotors.

Because quality problems are infrequent, it is not economical to perform expensive tests on every individual rotor. However, since hidden defects do occur occasionally, there is a need to perform a very low cost test on each rotor, especially those which are not assembled with a stator to form a complete machine at the time the rotor itself is manufactured.

Accordingly, an object of the present invention is to provide an improved method for nondestructively testing for a defect in a dynamoelectric machine rotor end ring and for balancing a rotor end ring having a detected defect.

SUMMARY OF THE INVENTION

In a preferred form of the invention a method is provided for testing for a defect in a dynamoelectric machine rotor end ring, and for balancing a rotor end ring having a detected defect. The method comprises the steps of generating a magnetic field and rotating a rotor end ring about an axis within the magnetic field and thereby inducing a voltage in the rotor end. The effect of the induced voltage is measured by sensing the axial magnetic flux associated with current flow induced in the rotor end ring to detect and locate a defect creating an electromagnetic imbalance in the rotor end ring. Material is removed from the rotor end ring having a detected defect to electromagnetically balance the defective end ring.

The subject matter which I regard as my invention is particularly pointed out and distinctly claimed in the concluding portion of this specification. The invention itself, however, both as to its organization and method of operation, together with further objects and advantages thereof may best be understood by reference to the following description taken in connection with the accompanying drawings.

BRIEF DESCRIPTION OF THE DRAWINGS

FIG. 14 is a test waveform for an acceptable end ring;

FIG. 15 is a test waveform for a defective end ring; and

FIG. 16 is a graph illustrating the individual IR drops in the end ring segments of two different rotors.

DESCRIPTION OF THE PREFERRED EMBODIMENTS

Figure 1:
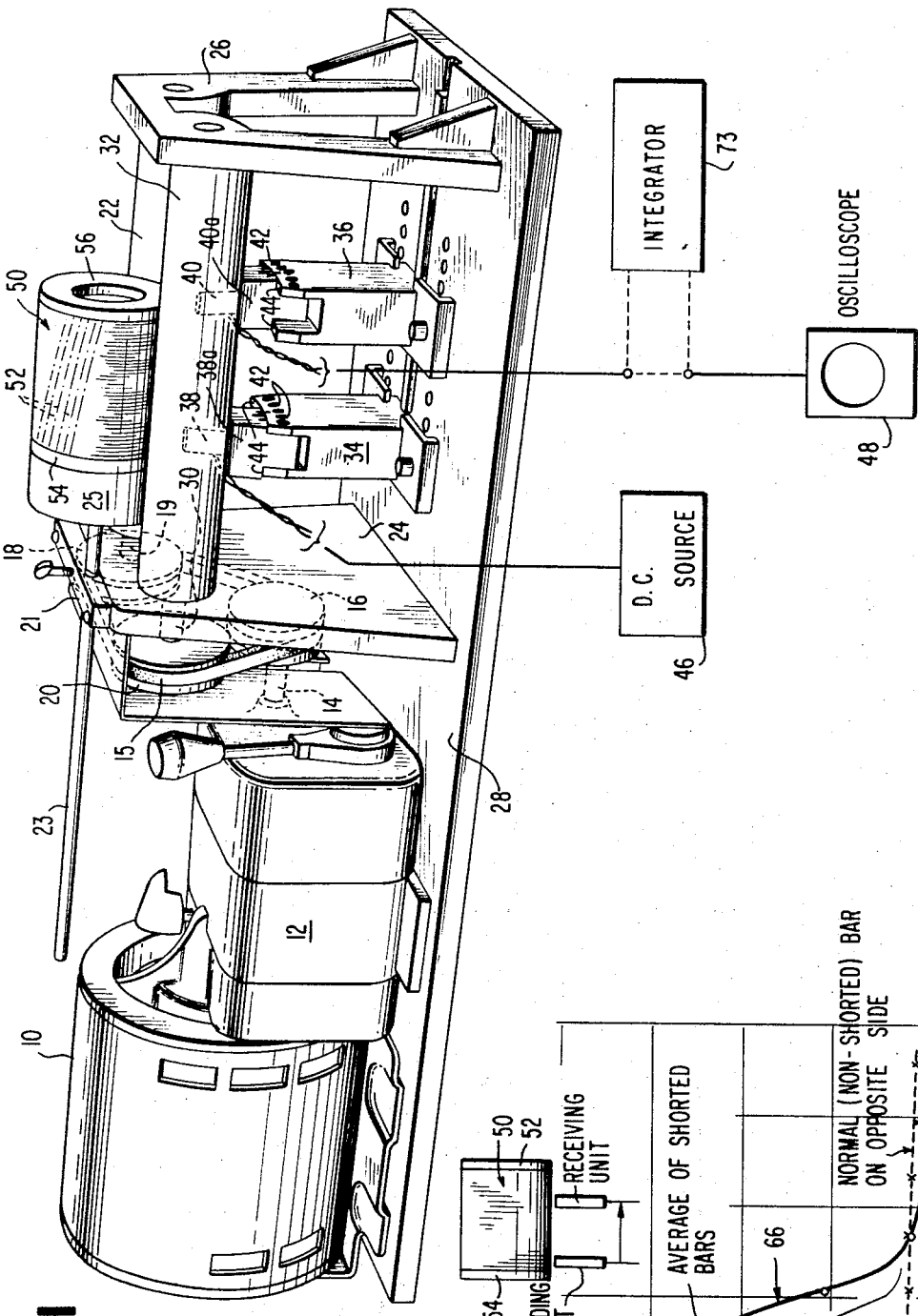
FIG. 1 is a diagrammatic perspective view of one form of test apparatus for testing squirrel cage rotor bars in accordance with the invention.

FIG. 1 is a perspective view of a preferred form of apparatus embodying the invention and that may be used in the practice of the same. A driving means, such as a variable speed electric motor 10 is coupled to a suitable transmission box 12 having a drive shaft 14 capable of running from 0 – 400 rpm in either direction. The shaft 14 is coupled to a driving pulley 16 which through a timing belt 15, drives pulleys 18 and 20. Pulley 18 is fixed to a shaft 19 which is fixed to a roller 22 supported for rotation in standards 24 and 26 which are in turn fixed to the same base plate 28 on which the motor 10 and transmission box 12 are mounted. Pulley 20 is fixed to a shaft 30 which is fixed to another roller 32 also supported for rotation in the standards 24 and 26.

Adjustably mounted on base plate 28 are a pair of support members 34 and 36. The adjustable mounting of these members permits variation in the spacing between them in a direction along the axes of the rollers 22 and 32.

A sending electromagnet 38 is adjustably mounted is support member 34. A receiving electromagnet 40 is similarly adjustably mounted in support member 36. As shown in FIG. 1, each of the support members 34 and 36 contains threaded holes 42 in which set screws are received. These set screws are used to establish the desired angular position or alignment of the electromagnets 38, 40. It will be noted that the electromagnets 38, 40 are anchored in holders 38a, 40a, and that the holders are movable along arcuate tracks 44 that have a center of curvature on the centerline of the rotor under test. Thus, the angular positions of the electromagnets 38, 40 relative one to the other may be adjusted and yet maintain a predetermined constant air gap between the peripheral surface of a rotor being tested and the pole tips of the electromagnets 38, 40. In addition, the supports 34, 36 are each provided with a scribed mark or other reference indicia, and the holders 38a, 40a are each provided with a plurality of marks. These marks may conveniently be used to indicate the angular positions of the holders 38a, 40a and thus electromagnets 38, 40 relative to a vertical reference plane passing through the center of the apparatus and rotor 50 supported thereon.

In addition to being of use in relatively positioning the electromagnets 38, 40 so that they will each be aligned with the same rotor conductor bar, and especially so with "skewed" bars; the electromagnets may be adjusted until signals of maximum strength are transmitted therebetween (as will be described in more detail hereinafter) and the above mentioned indicia will then indicate the amount or degree of skew for a rotor being tested.

In one form of the invention, the sending electromagnet 38 is energized by a suitable direct current source 46 to produce a constant magnetic field, and the receiving electromagnet 40 is connected to an oscilloscope 48 to display the waveform of the magnetic flux sensed by the receiving electromagnet.

In operation, a squirrel cage rotor 50 is placed on the rollers 22 and 32 so that the rotor is rotated by friction when the rollers are rotated. The rotor consists of a laminated core containing slots (not shown) in which are disposed the conductor bars 52 of the squirrel cage which is completed by end rings 54 and 56.

The axial position of rotor 50 along the rollers 22 is determined by the position of an adjustable stop 25 against which the rotor 50 tends to bear during operation of the apparatus. The position of stop 25 in turn may be fixed as desired by clamping mechanism 21 which is used to determine the axial position of the rod 23 which is secured to stop 25. If stop 25 were not provided, the rotor 50 would tend to become centered relative to electromagnet 38 during operation of the apparatus.

In operation, rotor 50 is placed on the rollers, as illustrated in FIG. 1, and the longitudinal positions of support members 34 and 36 are adjusted such that electromagnets 38 and 40 are aligned approximately with the opposite ends of bars 52 on the rotor. When the bars are skewed as illustrated in FIG. 1, the angular position of at least one of the electromagnets 38 and 40 is adjusted such that both of the electromagnets are adjacent the opposite ends of each rotor bar as it moves therepast during rotation of the rotor.

When it is desired to determine the conductor skew angle in skewed rotors for which this characteristic is unknown (and particularly when the conductors or bars are not externally visible and it is not desirable to destroy the rotor by cutting it apart or otherwise machining), one of the magnets, e.g., the sending or receiving electromagnet, may be set to be vertical and the other variably positioned until a signal of maximum strength (as determined, for example from the oscilloscope) is detected. The relative angular dispositions of the electromagnets may then be measured or determined directly by the alignment or position of the previously mentioned indicia. The difference in angular disposition of the electromagnets, relative to a vertical or other reference plane will then be an indication of the previously unknown skew angle of the rotor conductors.

When the drive means 10 is energized to rotate rollers 22 and 32, the rotor is rotated so that the left ends of the conductor bars 52 rotate within the magnetic field produced by the sending electromagnet 38. A voltage is induced in each bar as it passes through the magnetic field, and the magnetic flux produced by the resultant current in each bar is sensed by the receiving electromagnet 40 which produces an electric signal which is displayed on the scope 48. Since the resistance of each bar determines the value of the current therein, the magnetic flux sensed by the receiving electromagnet 40 is proportional to the resistance of each bar.

Figure 2:
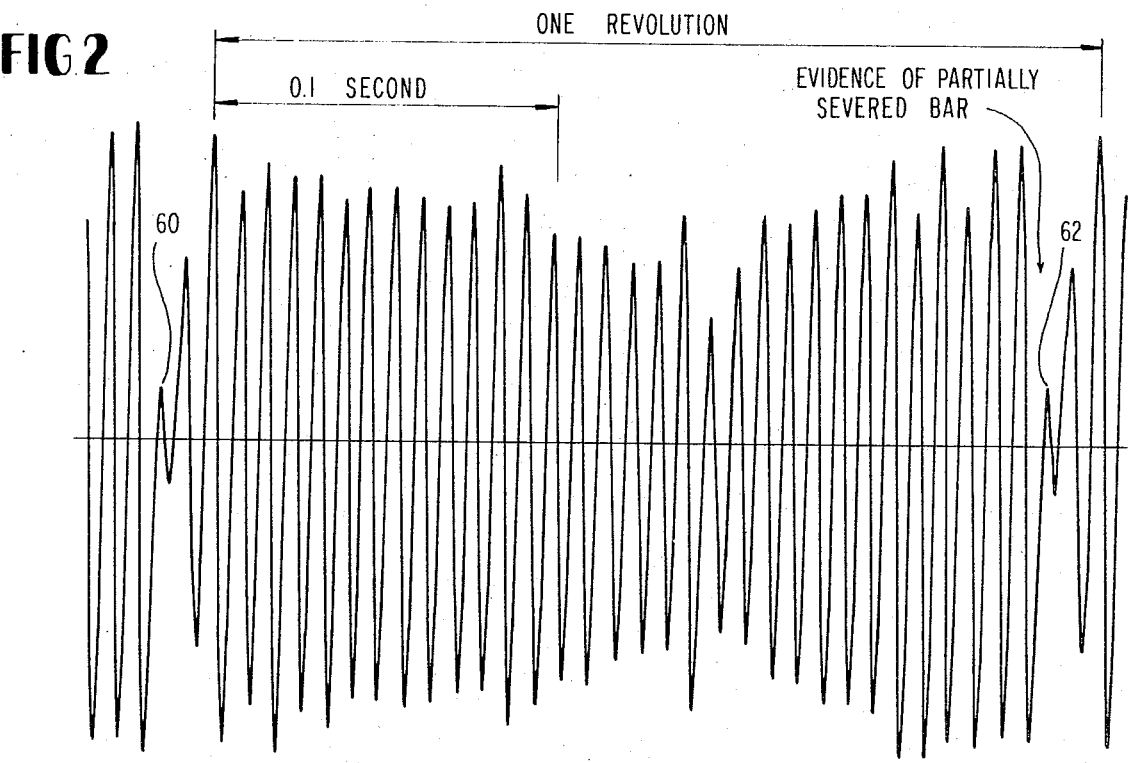
FIG. 2 is a test waveform illustrating a high resistance bar in a squirrel cage rotor tested in a constant magnetic field.

As the rotor 50 and conductors 52 are rotated through the magnetic field produced by the electromagnet 38, receiving electromagnet 40 will sense a periodically varying magnetic flux caused by the rotor iron separating the conductor bars. A corresponding periodically varying waveform consisting of a series of peaks corresponding to each bar will be displayed on oscilloscope 48 as illustrated in FIG. 2. The signature of amplitude of the peaks of this waveform will be a measure of the resistance of the bars. However, an important criterion in determining the performance of the rotor is uniformity of resistance of the bars, which uniformity can be determined by noting the relative amplitude of the peaks. For example, in FIG. 2 the peaks 60 and 62 are very low, thereby indicating a high resistance in the corresponding bar. This high resistance could be due to a partially severed bar or by a high porosity bar. With a bar completely missing or completely open circuited, the corresponding peak would be completely missing from the waveform.

Figure 4:
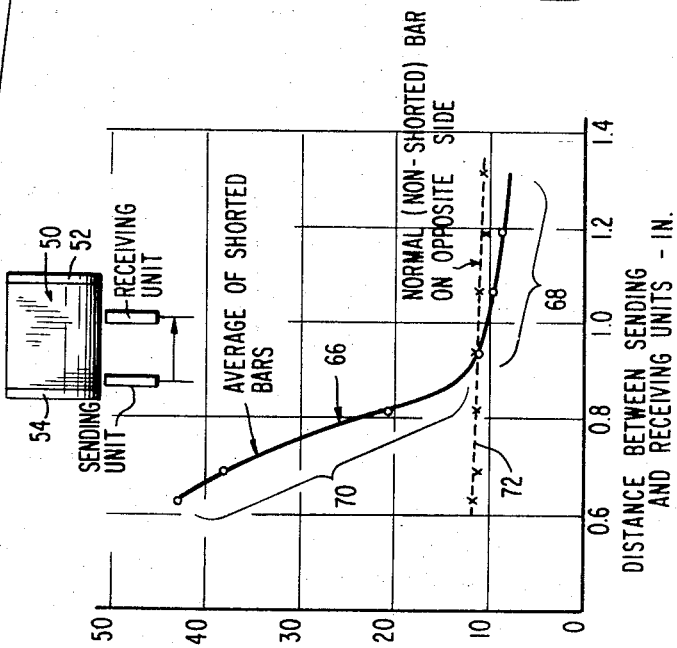
FIG. 4 is a graph illustrating the test signal amplitude as a function of the distance between the sending and receiving units of the apparatus illustrated in FIG. 1.
Figure 3:
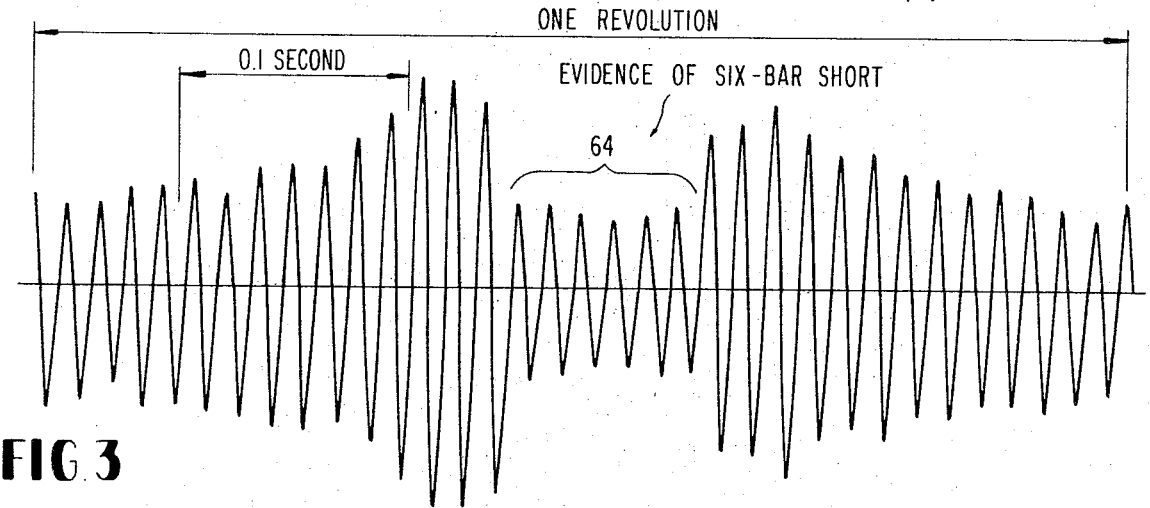
FIG. 3 is a test waveform illustrating short circuited bars in a rotor.

FIG. 3 illustrates a waveform for a rotor having six adjacent bars which are short circuited together. This short circuit is indicated by the six relatively low peaks 64. In order to identify the actual position of the short circuit, the receiving electromagnet 40 may be moved axially towards the opposite end of the rotor until the peak changes from a relatively low value to a relatively high value. A graph of such a movement of the receiver electromagnet 38 is illustrated by the curve 66 in FIG. 4. The portion 68 of curve 66 shown a relatively low amplitude of the displayed signal when the sending unit 38 and the receiving unit 40 are on opposite sides of the short circuit. The portion 70 of curve 66 shows the relatively high amplitude signal which occurs when the receiving unit 40 is on the same side of the short circuit as the sending unit 38. For comparison, the dash curve 72 shows the amplitude of the oscilloscope signal for a normal bar on the same rotor.

The oscillograms illustrated in FIGS. 2 and 3 were made with three amperes direct current applied to the sending electromagnet 38. The relatively minor variations in peak amplitude shown in FIGS. 2 and 3 are a common occurance in rotors tested and does not necessarily indicate unacceptable preformance of a rotor when assembled into a motor. It does, however, indicate the presence of some form of electromagnetic eccentricity which could be due to bar-to-core iron insulation resistance defects or resistance variations due to porosity or impurities, cage eccentricity, or variation in core/slot thickness.

If this variation in the amplitude of the peaks of the waveform is caused primarily by bar-to-iron electrical contact, appreciable variation in the waveform signature with actual position of the receiving electromagnet 40 will occur as it does in a case when adjacent rotor bars are short circuited. In order to eliminate the effect of this bar-to-iron contact on the measurement of the impedance of individual bars, two electromagnet sending units are positioned at opposite ends of the rotor with the receiving electromagnet in the center of the rotor.

In the tests described above, the waveforms displayed on the oscilloscope are proportional to the rate of change of magnetic flux as detected by the receiving electromagnet 40. In a variation of the apparatus, the output of the electromagnet unit 40 is fed to an integrating circuit 73 whose output is then connected to the oscilloscope so that the oscilloscope displays a waveform proportional to total flux rather than to the rate of change of flux. The amplifying effect of the integrating circuit causes the oscilloscope waveform to indicate residual magnetism effects in the rotor iron. This variation also permits the observation of characteristics such as slot bridge thickness variations and anisotropy in the iron.

Figure 5:
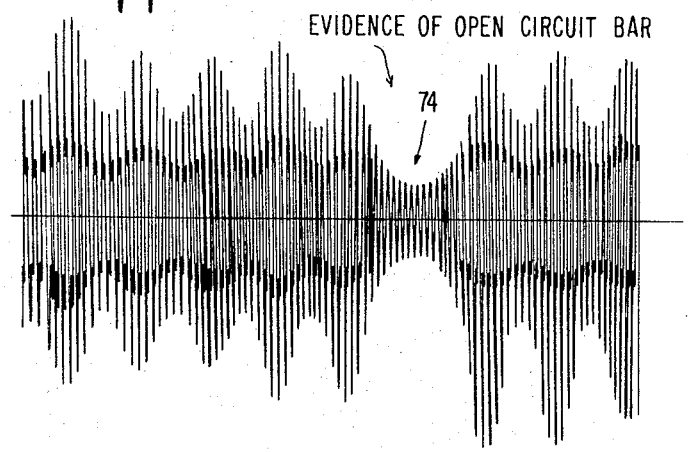
FIG. 5 is a test waveform illustrating an open circuited bar in a squirrel cage rotor tested in a periodically varying magnetic field.

The waveforms illustrated in FIGS. 2 and 3 were made with about three amperes direct current flowing in the coil of the sending electromagnet 38. As a variation, the sending unit 38 may be energized by alternating current, such as 2.5 amperes at 400 Hz. The resulting waveform for such an energization is shown in FIG. 5 where an open circuited bar is indicated at 74. The construction details of electromagnets 38 and 40 will be described in more detail hereinafter.

Figure 6:
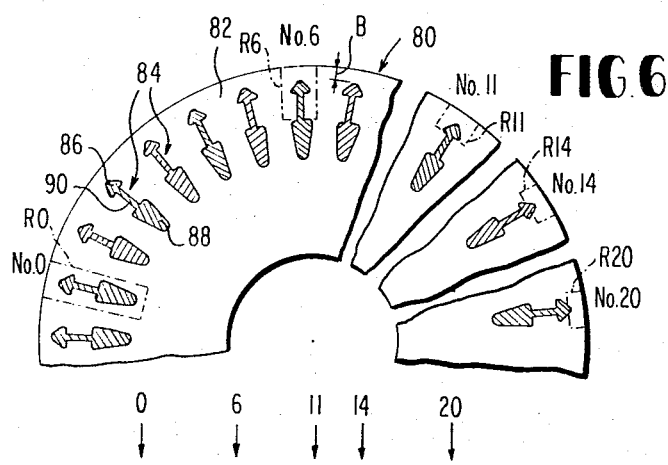
FIG. 6 is a partial cross-sectional view of a double squirrel cage rotor having various defects in its rotor bars.

The previously described method and apparatus related to the testing of a single cage rotor. However, the method and apparatus may also be used to test the conductor bars of a double cage rotor 80, a partial cross-sectional view of which is illustrated in FIG. 6. Such a rotor consists of a laminated core stack 82 containing slots for receiving a plurality of bars 84, each consisting of an outer bar 86 and an inner bar 88 joined by an integral web 90. The particular rotor illustrated has 28 slots equally spaced around the circumference of the rotor. In testing such rotors, high resistance defects in the outer bars tend to be masked by the low resistance inner bars which are connected in parallel with the outer bars.

Figure 7:
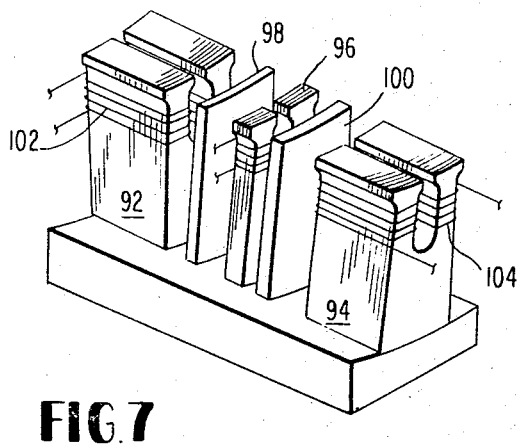
FIG. 7 is a diagrammatic perspective view of one form of an apparatus for testing squirrel cage rotors in accordance with the invention in one form thereof.

For the testing of such a double cage rotor, the apparatus of FIG. 1 is modified as schematically illustrated in FIG. 7. More particularly, in this variation, two sending electromagnets 92 and 94 are longitudinally adjusted so that they are positioned beneath the opposite ends of the bars 84 of rotor 80. As in FIG. 1, the electromagnets 92 and 94 are angularly positioned in accordance with the skew of the bars so that the electromagnets are positioned at the opposite ends of each conductor as the rotor is rotated. A receiving electromagnet 96 is positioned approximately at the center of the rotor. Magnetic shields 98 and 100 are positioned between the receiving electromagnet 96 and each of the electromagnets 92 and 94 in order to shield the receiving electromagnet from the magnetic fields generated by sending electromagnets 92 and 94, thereby assuring that electromagnet 96 senses only the magnetic flux generated by the current flowing in the rotor bars 84.

The magnetic structure and winding arrangement of the receiving electromagnets 40 and 96 were the same. In both cases, a stack of lamination parts (cut from a stator as will be understood) had a stack height of 0.2 of an inch. Eight laminations were used in each pole piece. On each of the two legs of each pole piece, 215 turns of 0.008 inch diameter copper magnet wire were provided. The 430 total turns so provided had a resistance, at 25°C, of about 5.8 ohms.

The sending unit 38 was formed of 8 laminations also, so as to have a 0.2 of an inch stack height. However, 84 turns of 0.0201 inch diameter copper magnet wire were provided on each leg and the 168 total turns had a resistance of about 0.4 of an ohm at 25°C. The sending units 92 and 94 were constructed similarly to sending unit 38 and were wound with the same diameter wire having about the same total resistance. However, 25 laminations were used in each unit 92, 94 to form stacks that were about 5/8 of an inch in height and the turns per leg were reduced to 50, so that a total of 100 turns per unit were used.

For test purposes, different defects were intentionally made in selected ones of the 28 bars of the rotor 80 which is shown in cross section in FIG. 6. The only bars in which defects were introduced were those identified as "No. 0", "No. 6", "No. 11", "No. 14", and "No. 20." In each case, a radially directed hole was drilled into the rotor at the selected bar locations for selected radial depths so as to remove a predetermined amount of the selected bars. These holes were located between the ends of the bars, and the depths of the holes for each bar are indicated by the phantom lines R0, R6, R11, R14, and R20, respectively.

It should be noted that the dimensional proportions of the actual rotor 80 were not as shown in FIG. 6, and that the bridge dimension B was less than 0.025 of an inch. This should be kept in mind, since the sensitivity of the illustrated apparatus to rotor bar defects will be dependent upon the thickness of this bridge. For example, the thicker the bridge, the more tendency there will be for rotor bar defects to be masked.

Still referring to FIG. 6, the bar No. 0 was open circuited because of the depth of the hole drilled therein. For slot No. 6, the outer bar 86 and web 90 were open circuited. For slot No. 11, only the outer bar 86 was open circuited. For slot No. 14, the hole R14 extended about half the depth of bar 86. For slot No. 20, the hole R20 penetrated only slightly into outer bar 86.

Figure 8:
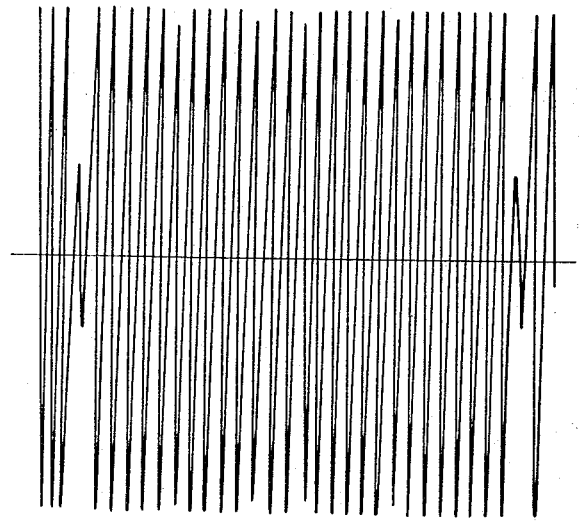
FIG. 8 is a test waveform for a double cage rotor having one pair of conductive bars open circuited.

The signature of the waveform displayed on the oscilloscope connected to the output of the receiving electromagnet 96 is illustrated in FIG. 8. The peaks of the waveform which correspond to slot Nos. 0, 6, 11, 14 and 20 (of the rotor 82) are indicated on FIG. 8.

FIG. 8 shows that, except for the completely severed bar in slot No. 0, the effect of the defects in the bars is not particularly severe. Such a result occurs because in a good casting the web 90 between the inner bar 86 and the outer bar 88 forms an effective jumper for a break in the outer bar. Even when the entire outer bar and web are severed, as shown for slot No. 6, there remains a path for current in the outer bar, with only a short detour through the web and a very short length of the inner bar. As shown in FIG. 8, such a defect does not show up as a drastic change in electrical characteristics, either in the rotor test performed by the apparatus and method of this invention or in actual motor performance when the rotor is assembled with a stator.

The waveform in FIG. 8 was produced by rotating rotor 80 at 77 rpm with direct current energization of the sending electromagnets 92 and 94 and with their respective energizing coils 102 and 104 wound so that their magnetic fields were aiding. The waveform illustrated in FIG. 8 is that of the voltage induced in the receiving electromagnet 96, and this voltage is proportional to the rate of change of the magnetic flux produced by the current flowing in the individual bars. As previously indicated, an integrating circuit can be connected between the receiving electromagnet 96 and the oscilloscope in order to obtain a display of the total magnetic flux in each bar.

In other tests, rotor 80 was rotated at speeds up to 250 rpm. At higher speeds, defects which appear only in the outer bars 86 become more conspicuous, since the masking or shielding effect of the webs 90 and inner bars 88 are minimized at the higher rotational speeds.

The sending electromagnets 92 and 94 and the receiving electromagnet 96 illustrated in FIG. 7 were cut from the laminations of a 36 slot stator. Improved results are obtained by fabricating the electromagnetic units from the laminations of a 28 slot rotor, so that the tooth pitch of the electromagnetic units exactly matches that of the rotor under test.

The foregoing tests of the conductor bars of a squirrel cage rotor may detect serious defects in the rotor end ring, however, it is possible that a rotor with no bar defects, but with serious end ring defects could pass the rotor bar test. The end rings constitute a part of the bar circuit, but their influence in comparison to that of an individual bar is usually negligible, and defective end rings are not detected unless the flaws therein are extreme. However, nonuniformly distributed porosity of end rings is a fault which can occur, and there follows a description of a method and apparatus for testing the end rings of a squirrel cage rotor, such a test to be used in conjunction with the rotor bar tests described above.

Figure 9:
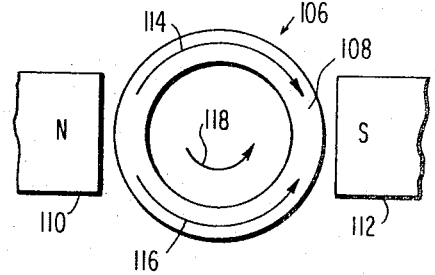
FIGS. 9, 10 and 11 are diagrammatic end views of rotors under test for end ring defects.

FIG. 9 is an end view of a squirrel cage rotor 106 which may be either of the single cage or double cage type and having an end ring 108. The rotor is rotated in a constant magnetic field provided by the poles 110 and 112 of a DC magnet, which may be either a permanent magnet or an electromagnet energized by direct current. Current resulting from voltage induced in a perfect end ring divides equally, and flows in the directions indicated by the arrows 114 and 116 for the direction of rotor rotation indicated by the arrows 118 and for the polarity of the magnet as illustrated. This ideal distribution of current produces no net axial component of flux to link the closed loop formed by the end ring 108.

Figure 10:
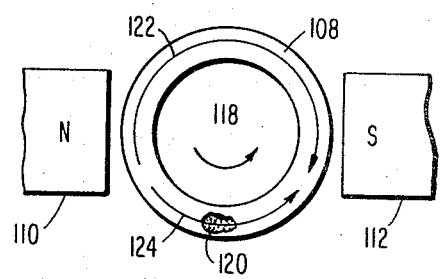
Figure 11:
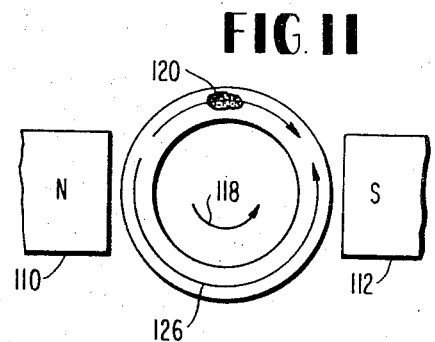

However, as illustrated in FIG. 10, if there is a defect in the end ring 108 in the form of a casting blow hole 120, for example, the end ring current pattern would then be as indicated by the arrows 122 and 124. That is, the net current would flow in the clockwise direction for the position of the end ring as illustrated in FIG. 10. The net magnetic flux linking such a defective end ring will, as a result of the magnetomotive force from the currents flowing therein, alternate as the end ring flaw 120 rotates with the rotation of the rotor. This fact can be more easily seen by considering the extreme case wherein the end ring fault 120 is a complete open circuit of the end ring. In that case all the current for the position of the end ring as shown in FIG. 10 will be clockwise producing magnetic flux downward into the paper. For the rotational position of the blow hole 120 as shown in FIG. 11, and again considering the blow hole as an open circuit, all the current will flow in a direction indicated by the arrow 126, and, consequently, the direction of the axial magnetic flux will be reversed. For the position of an open circuit between those illustrated in FIGS. 10 and 11, the division of the current will be equal and there will be no net magnetic axial flux despite the presence of the blow hole.

Consequently, a single concentrated end ring fault will result in a one cycle per revolution alternating component of flux in the axial direction of the rotor, and this flux will link the end ring. The external magnetic field provided by the magnetic poles 110 and 112 need not be symmetrical as illustrated. A truly round rotor without defects turning at constant speed about its own axis in a DC flux field of any configuration will not give rise to alternating flux at any point in the rotation. The presence of discrete slots and bars, or vent holes in the rotor, is a form of out-of-roundness and can produce pulsations in the axial flux, but as a practical matter such pulsations are highly discernible in the overall axial flux pattern. By contrast, factors which can cause fluctuations in the end ring axial flux are major nonuniformity of bar resistance, laminations not being perpendicular to the axis of the rotor and electromagnetic nonuniformity in the end rings. It has been found that irregularities and nonuniformities in the conductive bars of the rotor have relatively small effect on the alternating axial end ring flux as compared to the effects of defects in the end ring per se.

Figure 12:
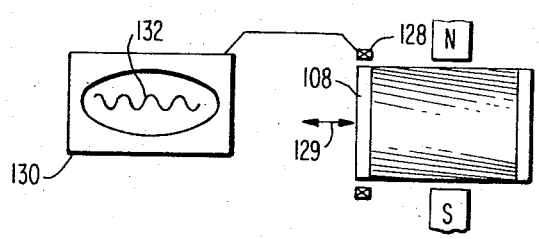
FIG. 12 is a schematic view showing the position of the receiving unit for an end ring test.

FIG. 12 is a schematic view of a means for sensing the axial flux caused by unbalanced currents flowing in the end ring. For example, a pick off coil 128 or receiver electromagnet is positioned concentrically with the end ring 108 so that the axial end ring flux 129 links coil 128 to induce a voltage therein which is then applied to oscilloscope 130 to display a waveform 132 proportional to the voltage induced in the pick off coil which in turn is proportional to the rate of change of the axial magnetic flux as the end ring rotates in the external magnetic field.

Figure 13:
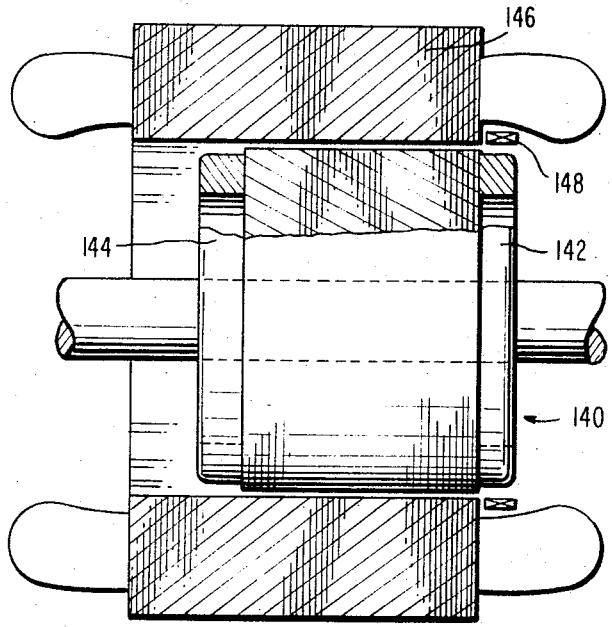
FIG. 13 is a diagrammatic view of another form of an end ring test apparatus.

FIG. 13 illustrates another form of apparatus for detecting the end ring axial flux. Here a test rotor 140 having end rings 142 and 144 is rotated within a standard induction motor stator 146 whose two pole winding is energized to produced a constant or DC magnetic field. The axial flux produced by the circular currents flowing in the end ring 142 is sensed by a pick up coil 148 mounted concentrically with the end ring. This pick up coil is wound with several hundred turns of fine wire on a spool having an inside diameter about equal to the stator bore. The axial length of the coil is approximately the same as the axial dimension of the end ring. The pick up coil may be mechanically mounted to the stator tooth tips.

The magnetic field generating arrangement illustrated in FIGS. 9, 10, 11 and 12 is preferable to that illustrated in FIG. 13 since the former has the advantage of permitting entry of the rotor from one side, not requiring a rotor shaft, and minimizing the cross field associated with induced bar currents.

In a variation of these end ring tests, an integrating circuit is connected between the pick up coil and the oscilloscope to produce on the oscilloscope a signal proportional to the net flux linking the pick up coil.

FIG. 14 shows an oscillogram of the output of a pick up coil for a normal, acceptable rotor. FIG. 15 illustrates the oscillogram for a rotor which failed in a motor performance test. In each case, the oscillogram reflects the magnitude of the axial flux produced by the circular currents flowing in an end ring. It can be seen from a comparison of FIGS. 14 and 15 that the axial magnetic flux for a rotor with a defective end ring is much higher than the axial flux for a good rotor.

FIG. 16 is a graph illustrating the individual IR drops for successive end ring segments of two rotors each having a 12 segment end ring 150. Curve 152 reflects the relatively uniform IR drops for an acceptable rotor end ring, and curve 154 shows the relatively nonuniform IR drops in the segments of a defective end ring. Rotor bar tests on both of these rotors had not shown a great deal of difference in the resistance of the rotor bars. However, the axial flux end ring test clearly shows that a rotor corresponding to curve 154 is unacceptable because of end ring defects, i.e., nonuniformity in resistance. In other words, the end ring test shows the electromagnetic eccentricity of the end ring of the latter rotor.

When the axial flux end ring test detects an electromagnetic eccentricity caused by high resistance in one segment of an end ring, the electromagnetic balance of the end ring can be restored by drilling a hole in the diametrically opposite end ring segment to introduce therein a corresponding high resistance. Since such high resistances in aluminum cast cages are due to variations in the porosity or density in the aluminum, the drilling of such holes to electromagnetically balance the end ring also results in mechanical balancing of the end ring. Such electromagnetic balancing of the end ring improves motor performance from the standpoint of locked rotor torque and noise.

While in accordance with the Patent Statutes I have described what at present is considered to be preferred embodiments of my invention, it will be obvious to those skilled in the art that numerous changes and modifications may be made therein without departing from the invention, and it is therefore intended in the appended claims to cover all such equivalent variations as fall within the true scope and spirit of the invention.

What I claim as new and desire to secure by Letters Patent of the United States is:

1. A method of testing for a defect in a dynamoelectric machine rotor end ring and for balancing a rotor end ring having detected a defect, the method comprising the steps of: generating a magnetic field; rotating a rotor about an axis within the magnetic field and thereby inducing a voltage in the rotor end ring; measuring the effect of the induced voltage by sensing the axial magnetic flux associated with current flow induced in the rotor end ring to detect a defect creating an electromagnetic imbalance in the rotor end ring; locating the defect to a segment of the rotor end ring; and removing material from the rotor end ring having a detected defect to electromagnetically balance the defective end ring.

2. The method of claim 1 wherein the rotor is rotated about an axis oriented generally perpendicular to the magnetic field.

3. The method of claim 1 wherein material is removed from the rotor end ring by drilling a hole in the end ring.

4. The method of claim 1 wherein material is removed from a portion of the rotor end ring disposed diametrically opposite the detected and located defect to electromagnetically and mechanically balance the defective end ring.

* * * * *